Oct. 31, 1933.  G. B. SHANKLIN  1,933,348
SEMIBALANCED PRESSURE SYSTEM FOR FLUID FILLED CABLES
Filed Dec. 30, 1930
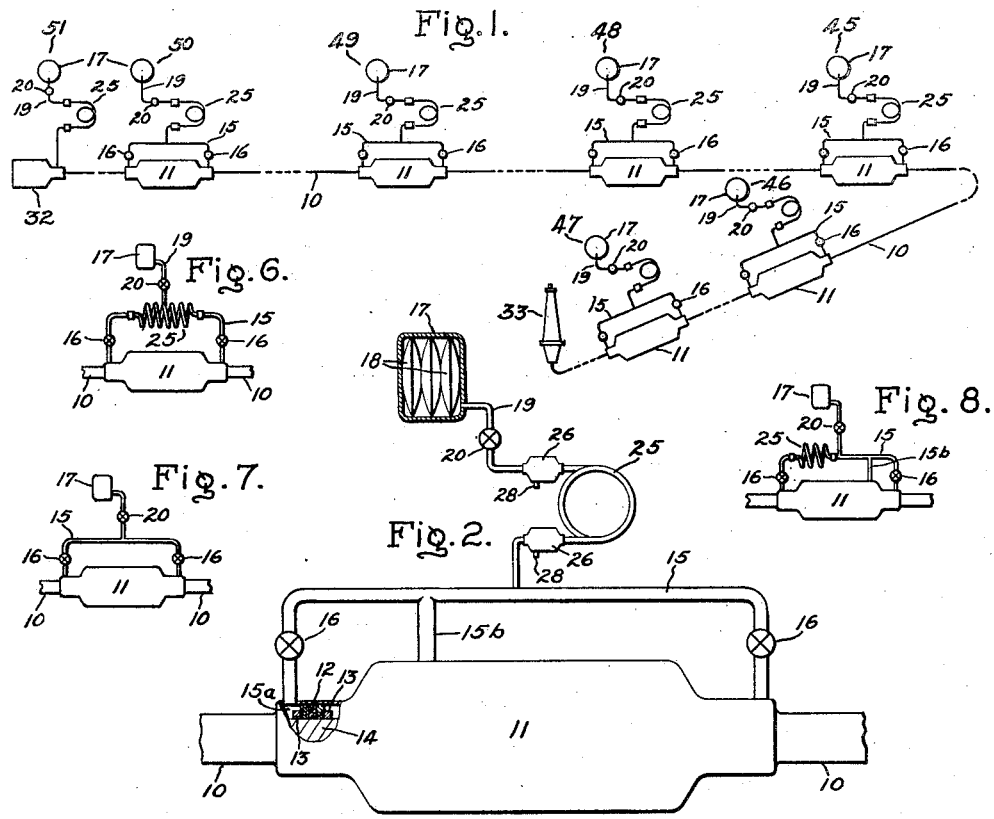
Inventor:
George B. Shanklin,
by Charles E. Tullar
His Attorney.

Patented Oct. 31, 1933

1,933,348

UNITED STATES PATENT OFFICE 1,933,348

SEMIBALANCED PRESSURE SYSTEM FOR FLUID FILLED CABLES

George B. Shanklin, Schenectady, N. Y., assignor to General Electric Company, a corporation of New York Application December 30, 1930
Serial No. 505,638

12 Claims. (Cl. 173—264)

In my prior application for patent Serial No. 310,398 filed October 4, 1928, is described and claimed a balanced pressure cable system, which, briefly stated, comprises a cable having a suitable channel for the fluid insulation, such as degasified oil, for example. The cable is divided into sections corresponding to reel lengths and these lengths or sections are connected by joints, in the casings of which are located suitable seals or semi-stop joints for preventing the free flow of oil from one length or section to another. Connected to the cable at spaced intervals are variable pressure reservoirs into and from which the oil is free to flow as the cable heats and cools. To compensate for difference of elevation of different parts of the cable the pressures exerted by the reservoirs on the oil are of different and suitable values so that there is no tendency for a cyclic exchange of oil between cable lengths. When so arranged the pressures within the reservoirs and the quantities of oil therein will vary in synchronism throughout the system. Installations of this character have been made and are in successful every day operation. Experience with these systems has demonstrated, however, that as a practical field problem it is difficult under the conditions of installation and with the apparatus and kind of workmen usually available to get the desired exact balance between the reservoirs.

I have discovered that by using suitable by-pass connections around the joints only an approximate or rough balance between the numerous reservoirs is initially required, a feature which greatly simplifies the installation of the system, also that the by-pass connections act as traps to prevent contamination in one section from affecting the other sections connected thereto. My improved system requires the use of fewer sizes of reservoirs than heretofore, and under certain conditions I may use simple pressure type reservoirs. The present system has the further advantage that any discrepancy which occurs in the initial pressure settings of the reservoirs is automatically taken care of by an exchange of oil through the by-passes and cable to the said reservoirs. I have also discovered that by means of restrictors suitably connected to the reservoirs and to the by-passes, the danger of adjacent cable lengths being drained due to injury to the enclosing sheath or covering of any one length is reduced to a negligible amount. Other novel features of my improved system will be set forth hereinafter.

For a consideration of what I believe to be novel and my invention, attention is directed to the following specification and the claims appended thereto.

In the drawing which is illustrative of my invention, Fig. 1 is a diagrammatic view of a fluid filled cable installation; Fig. 2 is a view of a cable joint and by-pass with a restrictor means for limiting the flow of insulating fluid to a cable section in the event of injury to its sheath; Fig. 3 is a view of a restrictor; Fig. 4 is a side view of the same; Fig. 5 is a view of modified form of restrictor; Figs. 6 to 8 are diagrammatic views showing the application of restrictors and by-passes to a cable system, and Fig. 9 is a sectional view of a reservoir containing insulating liquid and a gas.

The particular construction of the cable itself is not material to an understanding of my invention and it may have one or more insulated conductors. It should, however, be of a type having an enclosure or sheath to confine the fluid insulation and one or more channels or passages through which fluid may flow longitudinally to suitably spaced reservoirs.

In Fig. 1 is illustrated a fluid filled cable system, one portion of which is level or substantially so and another portion at an angle thereto and representing cable laid on a hilly or inclined surface. The cable 10 is manufactured in reel lengths or sections which are united or spliced after installation by joints of any suitable character contained in casing 11. In some or all of the joint casing are so-called semi-stop joints, meaning thereby a type of joint which acts as a dam or obstruction to prevent the free flow of fluid from one section to another but which may permit a limited amount of fluid to migrate through the insulation on the conductor or conductors or between the strands of the conductors from one section to another. These semi-stop joints have certain important functions. The cable as installed is filled with degasified fluid, such as oil, for example, and the joints serve as means to prevent draining of the cable during the jointing operation as well as to prevent the entrance of foreign matter. The joints also serve as means to prevent draining of the cable system in the event of the rupture of the sheath or a joint casing during subsequent operation. The joints may be made in a variety of ways, one of which is illustrated in Fig. 2 where 12 indicates a body of compressible material such as cork held between suitable clamps 13. The material 12 by the action of the clamps is held in firm contact with the insulation or other covering 14 on the conductor and also with the inner wall of the joint casing. Both ends of the joint casing are similarly provided with these stop joints, and the casing is connected to the lead cable-sheaths by wiped soldered joints. Connecting the adjacent ends of two cable sections in a manner to shunt or by-pass the two semi-stop joints in the joint casing is a by-pass 15 which may be made of thin walled tubing, for example, of soft copper or lead so that it may be pinched off or closed should occasion demand. The ends of each by-pass are connected to chambers 15ᵃ which are in direct communication with the channels within the cable whether said channel is within the conductor itself or between the insulation thereon and the enclosing sheath. In the by-pass are or may be valves 16 one on each side of a restrictor by means of which the fluid flow can be controlled. The joint casing is filled with degasified oil after being installed. Its future requirements as to oil may be taken care of by seepage from the cable or a pipe connection 15ᵇ may be made with the by-pass. The by-passes when properly installed as shown act as traps after the fashion of a trap in a drain pipe and prevent the transfer of water, air or other impurities from one section to another should one length in the system be injured. In other words, they prevent contamination in one section from spreading to another. The by-passes also afford a ready means for cutting off the flow of fluid insulation in case a repair to a cable section is necessary for any reason. One great advantage in having these by-passes outside of the cable as distinguished from being within it, is that they are accessible, can be easily inspected and may be opened or closed without having to open the joint casing or in any way disturbing the cable. It also results in a great saving in expense, for the cost of opening a cable for any purpose is large, and is to be avoided if possible.

In order to take care of the expansion and contraction of the fluid due to temperature changes of the cable, and to insure complete filling of the cable at all times to the exclusion of voids or spaces suitable reservoirs 17 are provided and arranged at spaced intervals which generally correspond to the spacing of the joints. They may be of any suitable construction. That shown in Fig. 2 comprises a sealed metal casing within which are numerous sealed cells 18 having elastic walls which yield in one direction in response to increased volume of fluid and move in the opposite direction in response to decreased volume. The cells are submerged in the oil contained in the casing. The reservoir is connected to the by-pass by a conduit 19 in which is located a shut-off valve 20. Any suitable means may be employed to regulate or control the initial pressures exerted by the numerous reservoirs of the system on the fluid, to the end that the pressure exerted by each shall be approximately that desired due to the elevation thereof caused by the profile of the cable of the installation. To prevent rapid exhaustion of a reservoir in the event of a rupture of a cable sheath or joint casing, a restrictor is placed in the pipe connections between the reservoir and the cable.

In Figs. 3 and 4 is illustrated a novel form of restrictor which is well adapted for the purpose herein set forth as it offers very little resistance to the slow normal movements of the fluid into and out of the reservoir but exerts a decided resistance to a larger and more rapid flow such as would take place if a leak developed. It comprises a tube 25, as of soft copper for example, having a small bore of the order of one-eighth of an inch in diameter and having a smooth interior wall. The tube is coiled into a helix for the purpose of saving space, and said coiled arrangement adds somewhat to the resistance to flow if there be a substantial drop of pressure on the outlet side. The length of tubing required will vary with different conditions. It may be of the order of four feet in some cases and all the way up to twenty feet in other cases.

On each end of the tube is a small casing 26 which may be made of two cup-shaped parts soldered together. Within the casing is a small fine mesh screen 27 to prevent impurities from passing into the tube which would tend to choke it. In advance of the screen is a fitting 28 which may be opened to act as a drain through which impurities may be removed. The helix or coil may be open in the center or the tube may be coiled about a cylindrical drum 29 as shown in Fig. 5. In this figure the drum is provided with enlarged end heads 30 which form parts of the casing for the screens, the other parts being formed by caps 31 which are soldered to the heads.

One end of the cable may terminate in a positive oil-stop joint such as 32, Fig. 1, or in an insulating terminal such as is indicated at 33.

In Fig. 1 is shown one application of a by-pass and restrictor. In this case the restrictor is located between the reservoir and the by-pass and through which oil flows from both adjacent cable sections to and from the reservoir. In this form of the invention oil is free to flow from one section to the other and through the cable from one reservoir to another. Movement of the oil through the cable is slow and depends of course upon the character of the oil channel in said cable. Should the cable be of the character in which the oil channel itself offers substantial resistance to flow, as is usually the case, said channel will restrict the escape of oil in the event of a rupture in the sheath or joint casing to a certain extent. Since the reservoir feeds or services both cable sections through the by-pass, its flow may be controlled both for normal and abnormal conditions by a proper setting of the valves 16 and 20.

In Fig. 6 is shown a somewhat different arrangement in which the ends of the restrictor are connected directly to the pipes forming the by-pass so that oil in flowing from one section to another has to flow through the restrictor. It also has to flow through a part of the restrictor in passing to and from the reservoir. For this purpose the restrictor is tapped at a point between its ends. Such an arrangement has the advantage of restricting the flow of oil from the section or sections on one side of a ruptured sheath to the point of rupture. It also restricts abnormal flow from the reservoir.

In Fig. 7 is illustrated a simple by-pass without a restrictor but having suitable valves 16 and 20 therein and in the pipe connecting the reservoir to it whereby the flow of oil can be controlled.

In Fig. 8 the restrictor is located in the by-pass as in Fig. 6 but the pipe to the reservoir is connected beyond one end of the restrictor. In this case the flow of oil from the left hand cable section to the right hand section through the by-pass is restricted while the flow of oil from the reservoir to the cable section on the right is unrestricted except to the extent that it may be controlled by the valves 16 and 20.

In Fig. 9 is illustrated a reservoir 35 of a different type from that illustrated in Fig. 2. It comprises an outer sealed casing 36 in which is located a stack of cells 37 which unlike those in Fig. 2 contain oil and all are connected to a manifold 38 in parallel. The manifold is connected by the pipe 39 to the by-pass 15. Above the cells is situated a perforated diaphragm 40 with which a wall of the top cell engages. 41 indicates a fitting by means of which gas may be introduced in variable amounts to vary the pressure exerted by the cells on the oil supply. To vary the effective action of the cells oil may be introduced in varying amounts through the fitting and in this manner the cubical contents of the casing as regards the amount of gas contained therein may be varied or adjusted to suit different operating conditions.

In carrying out my invention the cable is laid in the usual manner following the contour of the earth's surface. The pressures to be exerted by the reservoirs are adjusted to the necessary values to give the approximate balance desired, and in this connection reference is made to those reservoirs connected to the parts of the cable extending over hilly ground. As to those parts of the cable which are horizontal or substantially so I may use the type of reservoir illustrated in Fig. 2 and obtain the necessary rough or approximate balance by using reservoirs of different size. The approximate balance may be obtained by providing in the expansion reservoir at the highest level a certain pressure, preferably a pressure which at no load on the cable and at the lowest temperature to be met with is equal to or slightly greater than atmospheric pressure and in the expansion reservoir located at lower levels a pressure equal to that in the first named reservoir plus an amount approximately equal to the static pressure in the cable section due to the static head of the oil therein. For example, in Fig. 1 in reservoir 45, which is assumed to be at the highest level, is established a pressure which is slightly in excess of that of the atmosphere. In reservoir 46 is established a gas pressure approximately equal to that in reservoir 45 plus an additional amount equal to a column of oil of the same height as the difference in elevation of reservoirs 45 and 46. In reservoir 47 is established a gas pressure equal to that in reservoir 45 plus an amount approximately equal to a column of oil of the same height as the difference in elevation of reservoirs 46 and 47. And in a similar manner the gas pressures in the other reservoirs between the high and low points are established. To state the matter another way, the initial pressures of the different reservoirs are graded according to the elevation of the cable at the points of connection thereto. Because of the presence of the by-passes it is no longer necessary to obtain the exact balance between reservoirs which is theoretically desirable in an installation of the character described in my aforesaid application. As to the remaining reservoirs 48 to 51, if the cable is approximately level they may be of character shown in Fig. 2 and of a size and having the necessary number of cells to take care of oil movements without the additional feature of a pressure adjustment. Changes in these reservoirs may be effected by changing the number of cells. The type of reservoir shown in Fig. 9 is well adapted for the purpose. In fact, one of the main purposes of the present invention is to allow the use of any type of reservoir that will give rough, approximate balance at all levels and under all conditions of change as the cable heats and cools.

Assuming the approximate pressure balance, the adjacent ends of each of two cable sections which are united by a joint are placed in communication with each other by opening the valve or valves in each by-pass. As a result oil will flow through the cable from one reservoir to another and a state of equilibrium will be obtained although the pressures within the several reservoirs may not exactly conform to those determined by the directions above given. In any event, the quantities of oil contained in the reservoirs will simultaneously increase and decrease by substantially like amounts, and each reservoir will take care of the requriments of approximately one half of both cable sections which are connected to the same joint.

The practice heretofore has been to mount the reservoirs as near as possible to the roof of the manhole to obtain the effect of gravity on the flow of fluid. With my improved system due to the balancing of the pressures of the reservoirs they may be located at any convenient place either above or below the cable and this constitutes an additional advantage for the systems as it reduces the necessary height of the manholes above the cable and its joints.

I have shown valves in connection with the by-passes as illustrating suitable and convenient means for shutting off the flow of liquid insulation from one part of the system to another, but as previously indicated I may use soft metal for the piping and depend upon pinching the pipe or pipes to stop the flow, the effect being the same in both cases. Of course where the piping is so subjected to pinching, it will be necessary to renew it with a new piece prior to putting the cable system in full operation.

The specific construction of the restrictor is not claimed herein as it forms the subject matter of a separate application for patent.

What I claim as new and desire to secure by Letters Patent of the United States, is:—

1. A cable system operating under variable fluid pressure conditions comprising insulated conductor means having a fluid containing channel, means for segregating the conductor means into sections as regards the fluid content, by-passes around the segregating means permitting cyclic exchange of fluid between sections, variable pressure reservoirs connected to the by-passes for feeding fluid to and receiving it from said channel, and means at each reservoir for imparting a determined initial pressure to the fluid therein, the pressure of the pressure imparting means of the different reservoirs being graded according to the elevation of the cable at the point where the reservoirs are located so that each will receive and retain its substantially proportionate share of the total fluid displaced from the cable as the volume of fluid increases and return its said share to the cable as the volume decreases.

2. A cable system operating under variable fluid pressure comprising lengths of insulated conductor means, each having a fluid containing channel, joints electrically connecting said lengths and preventing the free flow of fluid between them, by-passes located outside of the joints connecting adjacent ends of the channels and permitting cyclic exchange of fluid between lengths, said by-passes also forming traps to prevent contamination of the fluid in one length from entering other lengths connected thereto, and variable pressure reservoirs connected to the by-passes for receiving fluid from and returning it to the by-passes and channels as the fluid in the cable heats and cools, said reservoirs being individually adjusted to determine initial pressures and volumes, depending upon the length of cable serviced thereby and upon its elevation with respect to other sections.

3. A cable system comprising lengths of sheathed, insulated conductors, each having a channel containing fluid insulation, joints electrically and mechanically connecting said lengths and restricting the flow of fluid between them, reservoirs varying both as to pressure and volume when in operation, said reservoirs being initially and individually adjusted one with respect to the others to cause approximate balance of their respective fluid volumes and pressures as determined by the profile of the surface on which the cable is laid so that each reservoir will receive and temporarily retain substantially its share of the total fluid displaced from the cable, by-passes for the joints permitting a cyclic exchange of fluid between lengths due to any lack of exact balance between them, and conduits connecting the reservoirs to the by-passes.

4. A cable system comprising lengths of sheathed, insulated conductors, each having a channel containing fluid insulation, joints electrically and mechanically connecting said lengths and restricting the flow of fluid between them, reservoirs varying both as to pressure and volume when in operation, means for initially and individually adjusting the reservoirs to cause approximate balance of their respective fluid volumes and pressures to suit the profile of the surface on which the cable is laid, by-passes for the joints permitting a cyclic exchange of fluid between lengths due to any lack of exact balance between them, conduits connecting the reservoirs to the by-passes, and a means situated between each reservoir and its connected by-pass through which fluid flows, said means offering a low resistance to cyclic exchange of fluid, and a substantially higher resistance to abnormal flow.

5. In a cable installation, the combination of a plurality of fluid filled cable lengths, some of which occupy different levels, joints connecting adjacent ends of the sections, a semi-stop device in each joint to prevent the free flow of fluid from section to section, a by-pass for each of the joints permitting cyclic exchange of fluid betwen cable lengths due to lack of exact balance between the reservoirs servicing them, variable pressure reservoirs connected to the by-passes to receive fluid from and to return it to the cable sections, certain of said reservoirs occupying different elevations, and means independent of the fluid contents of the cable sections establishing determined and different initial pressures in those reservoirs situated at said different elevations to cause each reservoir to receive substantially its share of the total amount of fluid displaced from the cable as it heats and to return said share to the cable as it cools.

6. In a cable installation, the combination of a pair of fluid filled cable lengths, a joint electrically connecting the same and preventing the free flow of fluid from one section to the other, a by-pass around the joint, a reservoir connected to the by-pass and receiving through it fluid as it flows from and back into the cable, and a restrictor located in the by-pass between the reservoir and one of the cable lengths permitting free cyclic exchange of fluid between lengths and offering progressively increasing resistance to the flow of fluid from the reservoir to said length under abnormal flow conditions.

7. A cable system comprising lengths of sheathed, insulated conductors, each having a channel containing fluid insulation, joints electrically and mechanically connecting said lengths and restricting the flow of fluid between them, a by-pass connected to each two sections around a joint permitting free cyclic movements of fluid between cable lengths, reservoirs connected to the cable through the by-passes to and from which reservoirs fluid from the cable flows, each of said reservoirs comprising a rigid wall casing, an element contained therein having a part movable in response to variations of pressure of fluid in the cable, and a body of compressed gas in the casing acting on said element and adjusted to a determined initial pressure depending upon its respective elevation and fluid receiving capacity, whereby an increase of pressure of the fluid in the cable causes, for the same unit length of cable, substantially the same increase of pressure and volume of fluid in each of said reservoirs and upon a decrease of said pressure substantially the same decrease of pressure and volume.

8. A cable system comprising lengths of sheathed, insulated conductors, each having a channel containing fluid insulation, joints electrically and mechanically connecting said lengths and restricting the flow of fluid between them, by-passes around the joints connecting the jointed ends of the lengths, restrictors in the by-passes permitting small flows of fluid and offering progressively increasing resistance as the rate of flow of fluid increases, and reservoirs operating under conditions of variable pressure and volume connected to the by-passes at such a point as to cause a portion of the fluid admitted to and discharged from the reservoirs to pass through the restrictors.

9. A cable system comprising lengths of sheathed, insulated conductors, each having a channel containing fluid insulation, joints electrically and mechanically connecting said lengths and restricting the flow of fluid between them, by-pass conduits around the joints connecting the jointed ends of the lengths, a restrictor forming a part of each of the conduits and through which fluid flows, and a reservoir operating under conditions of variable pressure and volume connected to an intermediate portion of each restrictor.

10. An electric cable system operating on the semi-balanced pressure plan comprising jointed lengths of insulated conductors, an impervious enclosure therefor, liquid insulation filling the enclosure to the substantial exclusion of voids, variable capacity reservoirs, each servicing a determined length of the cable and constantly exerting a determined pressure on the liquid to prevent void formation, said reservoirs being connected in parallel to the interior of the enclosure, and being initially and individually adjusted to such determined pressures, depending upon the length of the cable serviced thereby and its elevation with respect to adjacent connected lengths, that each receives substantially its proportionate share of the liquid displaced from the cable as the liquid heats and returns said share to the cable as the liquid cools, and by-passes around the cable joints through which sufficient liquid passes during each cycle of heating and cooling to compensate for any lack of exact balance between the reservoirs in their operations occasioned by their respective initial pressure adjustments.

11. An electric cable system operating on the semi-balanced pressure plan comprising lengths of insulated conductors, impervious enclosures therefor, liquid insulation filling the enclosure to the substantial exclusion of voids, means segregating the conductor into sections as regards the liquid content, variable capacity reservoirs servicing determined sections of the cable and exerting variable pressures on the liquid therein to prevent void formation, each reservoir comprising an expansible element connected to the interior of an enclosure to receive liquid therefrom and return it thereto as the volume of the liquid changes due to temperature changes, each of said reservoirs exerting such a determined initial pressure on the liquid, having regard to the length and elevation of the section serviced by it, as will cause them to operate in unison and each receive substantially its proportionate share of the total liquid displaced from the cable during heating and return the share so received upon cooling, and by-passes around the segregating means which permit of a cyclic exchange of liquid between sections to compensate for any lack of exact balance occasioned by the respective initial pressure adjustments of the individual reservoirs.

12. In a cable installation, the combination of lengths of cable each containing thin insulating fluid, joints electrically connecting the cable lengths and preventing the free flow of fluid from one length to another, by-passes around the joints, reservoirs connected to the by-passes to receive fluid from the cable lengths on opposite side of the by-passed joint as the fluid heats and return it thereto as the fluid cools, and restrictors located between the reservoirs and the by-passes permitting free flow of fluid during cyclic exchanges of fluid between the reservoirs and cable and imposing a progressively increasing resistance to flow of fluid as the difference of fluid pressure between that in the reservoir and in the cable progressively increases.

GEORGE B. SHANKLIN.